United States Patent
Reina

(10) Patent No.: US 12,019,877 B2
(45) Date of Patent: Jun. 25, 2024

(54) METADATA ALLOCATION IN MEMORY SYSTEMS

(71) Applicant: Micron Technology, Inc., Boise, ID (US)

(72) Inventor: Vincenzo Reina, Munich (DE)

(73) Assignee: Micron Technology, Inc., Boise, ID (US)

( * ) Notice: Subject to any disclaimer, the term of this patent is extended or adjusted under 35 U.S.C. 154(b) by 16 days.

(21) Appl. No.: 17/813,286

(22) Filed: Jul. 18, 2022

(65) Prior Publication Data

US 2024/0020016 A1   Jan. 18, 2024

(51) Int. Cl.
*G06F 3/06* (2006.01)

(52) U.S. Cl.
CPC .......... *G06F 3/0616* (2013.01); *G06F 3/0644* (2013.01); *G06F 3/0659* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 2009/0100115 A1* | 4/2009 | Park | G06F 3/0643 |
| 2014/0149473 A1* | 5/2014 | Kim | G06F 16/1847 707/824 |
| 2015/0309926 A1* | 10/2015 | Damle | G06F 12/0246 711/103 |
| 2022/0253244 A1* | 8/2022 | Lee | G06F 3/0656 |

* cited by examiner

*Primary Examiner* — Charles J Choi
(74) *Attorney, Agent, or Firm* — Holland & Hart LLP

(57) ABSTRACT

Methods, systems, and devices for metadata allocation in memory systems are described. Different blocks of a memory device of the memory system may be utilized for storing different types of data. For example, a first block may be utilized to store journaling data and a second block to store data (e.g., user data) received from a host system. The first block may include memory cells operable as high endurance single-level cells, and may be configured to support a high frequency of write operations of data with low retention rates. Additionally, the second set of block may include memory cells (e.g., a high density of memory cells) operable as multiple-level cells, and may be configured to retain large quantities of data.

23 Claims, 6 Drawing Sheets

METADATA ALLOCATION IN MEMORY SYSTEMS

FIELD OF TECHNOLOGY

The following relates to one or more systems for memory, including metadata allocation in memory systems.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not—or (NOR) and not—and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

Some memory systems may generate and store metadata corresponding to access commands (e.g., read commands, write commands) received from a host system. For example, a memory device of the memory system may generate and store metadata indicating that a command has been received by the memory system, and metadata indicating whether the command has been successfully performed. Such metadata may be used to facilitate recovery operations if a command is unsuccessfully performed. In some examples, the metadata may be stored in various portions of the memory system (e.g., different blocks of cells) irrespective of such factors as density, endurance, and data retention rates associated with the portion of the memory device that stores the metadata. Accordingly, relatively large quantities of metadata may be written using inefficient or otherwise ancillary operations that may negatively impact (e.g., shorten) the useful life of one or more blocks of the memory device due to the frequency and high quantity of operations associated with the metadata.

In accordance with examples as disclosed herein, different portions of a memory device may be dedicated for storing different types of data. For example, a first portion of a memory device may be dedicated for storing first metadata (e.g., journaling data), a second portion may be dedicated for storing data (e.g., user data) received from a host system, and a third portion may be dedicated for storing second metadata (e.g., logical mappings and other types of metadata). The frequency of access and the duration of retention may be different for each of those different types of data. Thus, the memory system may be configured with different portions to store the different types of data and thereby extend the life of the memory system. The first portion may include a plurality of memory cells operated as high endurance single-level cells (HESLCs). HESLCs may be suitable to store journaling data, as such cells may support a relatively large frequency of write operations as compared with a frequency of write operations. Additionally, the duration of retaining journaling data may be relatively small. The second portion may include a plurality of memory cells operated as multiple level memory cells (e.g., multi-level cells (MLCs), triple level cells (TLCs), or quad level cells (QLCs)), which support write operations including relatively large quantities of data. For example, the multiple level memory cells may be suited to store data received from the host system. The third portion may include a plurality of memory cells operated as single level cells (SLCs), where SLCs may be suitable to store metadata, as such cells support a high frequency of write operations of relatively small data packets. By dedicating suitable portions of the memory device to store different types of data, the useful life of the memory system may be prolonged and its overall performance may be improved.

Figure 1:
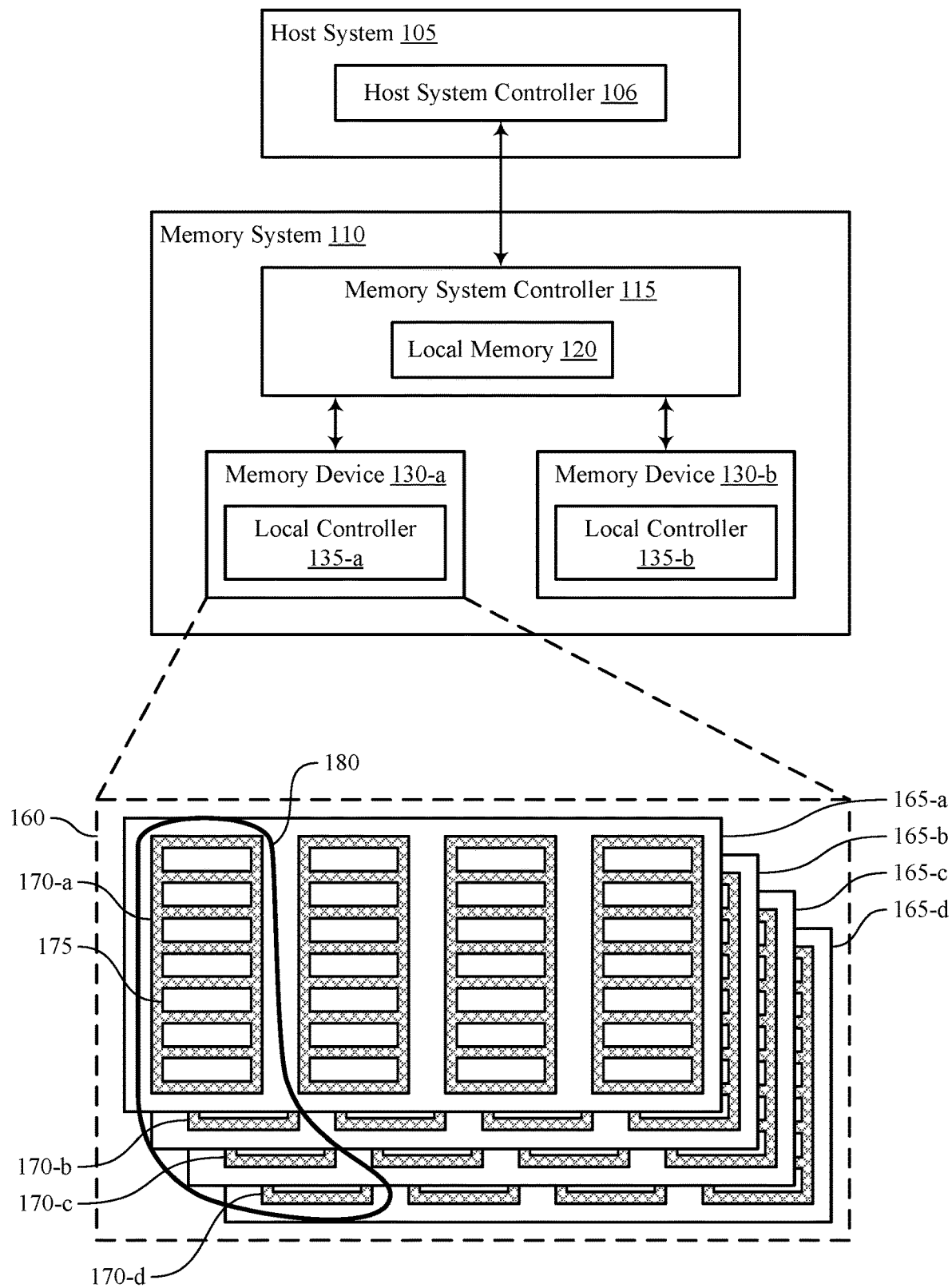
FIG. 1 illustrates an example of a system that supports metadata allocation in memory systems in accordance with examples as disclosed herein.
Figure 2:
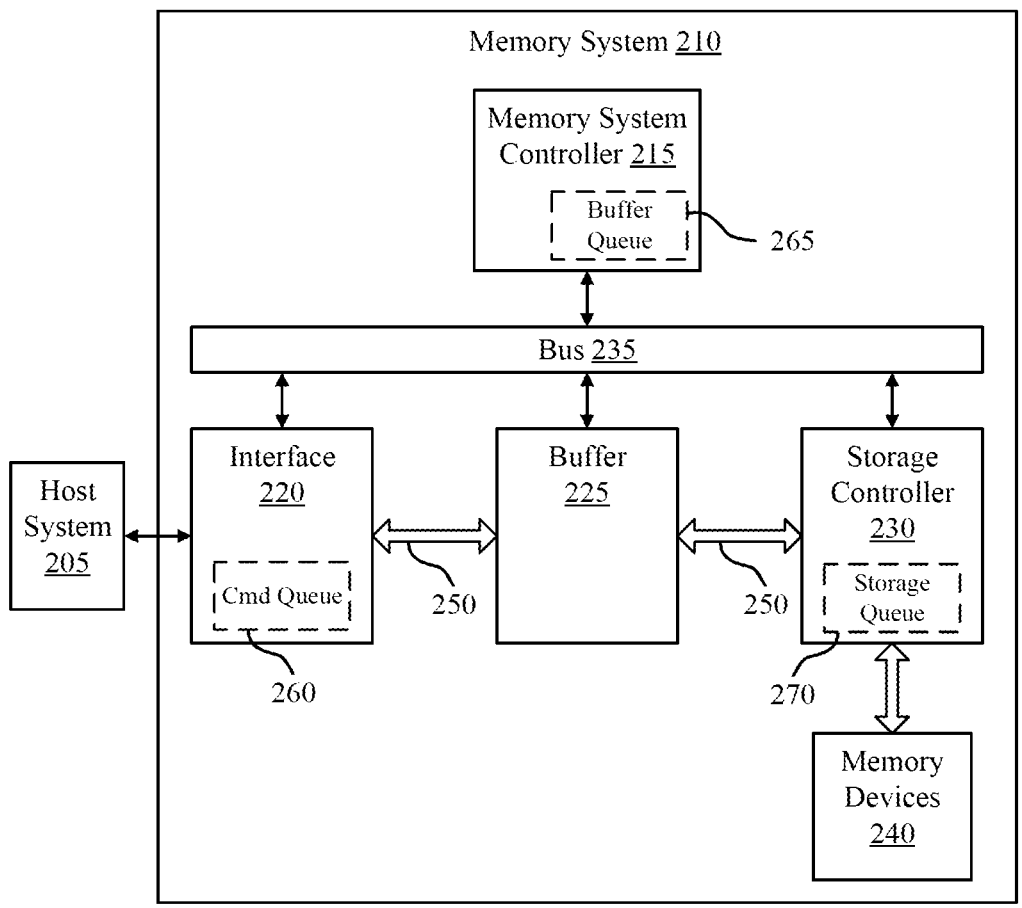
FIG. 2 illustrates an example of a memory architecture that supports metadata allocation in memory systems in accordance with examples as disclosed herein.

Features of the disclosure are initially described in the context of systems, devices, and circuits with reference to FIGS. 1 and 2. Features of the disclosure are described in the context of systems and a process flow diagram with reference to FIGS. 3 and 4. These and other features of the disclosure are further illustrated by and described in the context of a block diagram and flowchart that relate to metadata allocation in memory systems with reference to FIGS. 5 and 6.

FIG. 1 illustrates an example of a system 100 that supports metadata allocation in memory systems in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EE-PROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as SLCs. Additionally or alternatively, a NAND memory device 130 may include memory cells configured to each store multiple bits of information, which may be referred to as MLCs if configured to each store two bits of information, as TLCs if configured to each store three bits of information, as QLCs if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The system 100 may include any quantity of non-transitory computer readable media that support metadata allocation in memory systems. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

In some cases, a memory system 110 may store metadata corresponding to data received from a host system 105 as part of a write operation (e.g., data associated with a write command). Data received from the host system 105 may be relatively large and may be retained for a relatively long duration (e.g., as compared to metadata). In some examples, first metadata may include journaling data and second metadata may include logical mappings and other, similar, metadata. As described herein, journaling data may include a first indication that an access command (e.g., a write command) has been received and is set to commence. Additionally or alternatively, journaling data may also include a second indication specifying whether the write operation was successfully completed (or unsuccessfully completed). Journaling data may be relatively small (e.g., a relatively small data packet) and may be written in accordance with frequent write operations. Logical mappings may include mappings between logical and physical addresses of the memory system 110 and may facilitate subsequent access operations (e.g., read operations, write operations). Logical mappings may be stored or otherwise updated using relatively frequent write operations (e.g., less frequently than journaling data) of relatively small quantities of data. In such cases, different types of data and metadata may have different characteristics relevant to storage in the memory system 110.

In accordance with examples as disclosed herein, different portions of a memory system 110 may be dedicated for storing different types of data. For example, a first portion of a memory device 130 may be dedicated for storing first metadata (e.g., journaling data), a second portion of a memory device 130 may be dedicated for storing data (e.g., user data) received from a host system, and a third portion of a memory device 130 may be dedicated for storing second metadata (e.g., logical mappings and other types of metadata). The first portion may include a plurality of memory cells operated as HESLCs. HESLCs may be suitable to store journaling data, as such cells may support a relatively large frequency of write operations (e.g., a larger frequency of write operations than SLCs). The second portion may include a plurality of memory cells operated as MLCs, which support write operations including relatively large quantities of data. For example, the MLCs may be suited to store data received from the host system 105. The third portion may include a plurality of memory cells operated as SLCs, where SLCs may be suitable to store metadata, as such cells support a high frequency of write operations of relatively small data packets. By dedicating suitable portions of a memory device 130 to store different types of data, the useful life of the memory system 110 may be prolonged and its overall performance may be improved.

FIG. 2 illustrates an example of a system 200 that supports metadata allocation in memory systems in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point or other chalcogenide-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240, e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, after completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation).

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210. After receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

After a determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine if the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225.

That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, performing garbage collection). The entries may be added to the storage queue 270, e.g., by the memory system controller 215. The entries may be removed from the storage queue 270 (e.g., by the storage controller 230 or memory system controller 215) after completion of the transfer of the data.

To process a read command received from the host system 205, the memory system controller 215 may again first determine if the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, when the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMNIC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed herein. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the described operations in conjunction with or instead of the memory system controller 215. In some cases, the memory system controller 215 may perform the functions of the storage controller 230 and the storage controller 230 may be omitted.

In some cases, a memory system 210 may store metadata corresponding to data received from a host system 205 as part of a write operation (e.g., data associated with a write command). Data received from the host system 205 may be relatively large and may be retained for a relatively long duration (e.g., as compared to metadata). In some examples, first metadata may include journaling data and second metadata may include logical mappings and other, similar, metadata. As described herein, journaling data may include a first indication that an access command (e.g., a write command) has been received and is set to commence. Additionally or alternatively, journaling data may also include a second indication specifying whether the write operation was successfully completed (or unsuccessfully completed). Journaling data may be relatively small (e.g., a relatively small data packet) and may be written in accordance with frequent write operations. Logical mappings may include mappings between logical and physical addresses of the memory system 210 and may facilitate subsequent access operations (e.g., read operations, write operations). Logical mappings may be stored or otherwise updated using relatively frequent write operations (e.g., less frequently than journaling data) of relatively small quantities of data. In such cases, different types of data and metadata may have different characteristics relevant to storage in the memory system 210.

In accordance with examples as disclosed herein, different portions of a memory system 210 may be dedicated for storing different types of data. For example, a first portion of a memory device 240 may be dedicated for storing first metadata (e.g., journaling data), a second portion of a memory device 240 may be dedicated for storing data (e.g., user data) received from a host system, and a third portion of a memory device 240 may be dedicated for storing second metadata (e.g., logical mappings and other types of metadata). The first portion may include a plurality of memory cells operated as HESLCs. HESLCs may be suitable to store journaling data, as such cells may support a relatively large frequency of write operations (e.g., a larger frequency of write operations than SLCs). The second portion may include a plurality of memory cells operated as MLCs, which support write operations including relatively large quantities of data. For example, the MLCs may be suited to store data received from the host system 105. The third portion may include a plurality of memory cells operated as SLCs, where SLCs may be suitable to store metadata, as such cells support a high frequency of write operations of relatively small data packets. By dedicating suitable portions of a memory device 240 to store different types of data, the useful life of the memory system 210 may be prolonged and its overall performance may be improved.

Figure 3:
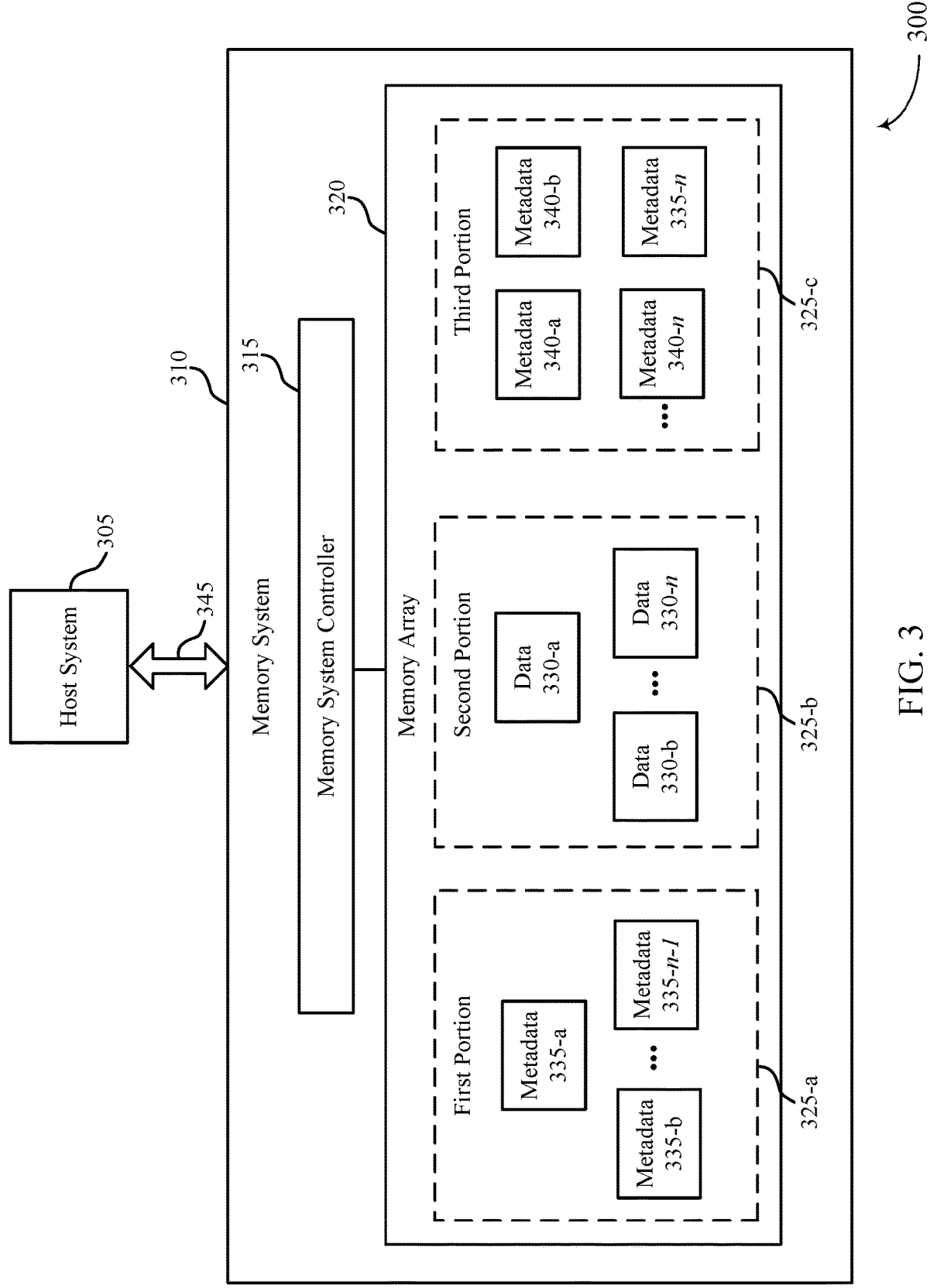
FIG. 3 illustrates an example of a system that supports metadata allocation in memory systems in accordance with examples as disclosed herein.

FIG. 3 illustrates an example of a system 300 that supports metadata allocation in memory systems in accordance with examples as disclosed herein. The system 300 may include a host system 305 and a memory system 310. In some examples, the host system 305 may be coupled with the memory system 310 via an interface 345. The memory system 310 may include a memory array 320 that includes a plurality of memory cells. For example, the memory array 320 may include at least a first portion 325-a of memory cells, a second portion 325-b of memory cells, and a third portion 325-c of memory cells. Each of the first portion 325-a, the second portion 325-b, and the third portion 325-c may be an example of a partition of a memory array or a memory array and may include one or more blocks (e.g., one or more blocks of memory cells) configured to store data 330, metadata 335 (e.g., first metadata 335), or metadata 340 (e.g., second metadata 340). By dedicating suitable portions of the memory system 310 to store different types of data, the useful life of the memory system 310 may be prolonged and its overall performance may be improved.

In some examples, the memory system controller 315 may be coupled with the memory array 320 and may receive commands from the host system 305 (e.g., via the interface 345). The memory system controller 315 may perform various operations associated with the memory system 310. For example, the memory system controller 315 may receive commands (e.g., read commands, write commands) from the host system 305, read and write data 330, generate metadata 335 and metadata 340 corresponding to the data 330, and read and write metadata 335 and metadata 340, among other operations. The memory system controller 315 may be configured to write data 330 to one or more blocks of the second portion 325-b and to write metadata 335 and metadata 340 to one or more blocks of the first portion 325-a and the third portion 325-c, respectively. In some cases, the memory system controller 315 may be configured to generate the metadata 335 and the metadata 340 in response to receiving a write command including data 330. In other examples, the memory system controller 315 may receive the metadata 335 (e.g., from the host system 305) as part of a command (e.g., a write command).

In some examples, memory cells of the first portion 325-a and the third portion 325-c may be operated as SLCs configured to store a single bit of data in accordance with a first type of write operation (e.g., a SLC write operation). The SLCs may support a high frequency of write operations of data (e.g., journaling data, logical to physical mappings) that is stored or otherwise updated frequently. In some cases, the memory cells of the first portion 325-a may be HESLCs, where the HESLCs may support a greater frequency of write operations of data than data stored to SLCs. Such characteristics (e.g., data retention characteristics) of HESLCs and, more generally SLCs, make each type of cell suitable to frequently store data for relatively short durations. Accordingly, the first portion 325-a may be dedicated (e.g., configured, preconfigured) to store the metadata 335 (e.g., journaling data), and the third portion 325-c may be dedicated to store the metadata 340 (e.g., logical to physical mappings).

In some examples, memory cells of the second portion 325-b may be operated as MLCs, where the MLCs may store two or more bits of data in accordance with a second type of write operation (e.g., a MLC write, a TLC write, a QLC write). In some cases, the MLCs may be associated with a second data retention characteristic and may support writing large quantities of data that is stored for a relatively long duration (e.g., compared to data stored to the first portion 325-a and the third portion 325-c). Accordingly, the second portion 325-b may be dedicated to store the data 330.

In some examples, the memory system 310 may receive a write command from the host system 305. The write command may include data 330 (e.g., data generated by a host system 305). The data 330 may have a greater density (e.g., may include a larger quantity of bits) than metadata 335 and metadata 340 and, as such, storing the data 330 to MLCs may preserve storage space as compared to storing the data 330 to SLCs. The data 330 may be stored for a relatively long duration (e.g., in association with a second data characteristic of the second portion 325-*b*).

In some cases, metadata 335 may be generated by the memory system controller 315 and may be an example of journaling data (e.g., corresponding to the data 330). The metadata 335 may include a first indication (e.g., first metadata) and a second indication (e.g., third metadata), where the first indication specifies that a write operation of data 330 is to be performed on the memory array 320 and the second indication specifies that the write operation of the data 330 was successfully or unsuccessfully completed. Accordingly, the first metadata may be generated (e.g., by the memory system controller 315) when the data 330 is received from the host system 305, and the third metadata may be generated (e.g., by the memory system controller) upon the data 330 being successfully or unsuccessfully written to the memory array 320. In some examples, the metadata 335 may support recovery operations (e.g., associated with a power transition, associated with one or more errors) of the memory system 310, where the memory system controller 315 may determine that an operation to write data 330 was successful if the first portion 325-*a* includes the first metadata and the third metadata corresponding to the data 330. The memory system controller may determine that the operation was unsuccessful if the first portion 325-*a* includes first metadata and does not include corresponding third metadata. Additionally or alternatively, the metadata 335 may be stored for a relatively short duration (e.g., in association with a first data retention characteristic of the first portion 325-*a*) and may have a relatively small storage size (e.g., compared to the data 330) suitable for frequent write operations to HESLCs.

In some examples, metadata 340 may include one or more mappings associated with the data 330, and may be generated or otherwise managed by the memory system controller 315. For example, the metadata 340 may include mappings between logical addresses and physical addresses of the memory system 310 (e.g., logical-to physical (L2P) tables) to facilitate access operations (e.g., read operations, write operations) associated with the corresponding data 330. In some examples, the metadata 340 may be stored for a duration greater than the storage duration for the metadata 335 and less than the storage duration of the data 330 (e.g., in association with a third data retention characteristic of the third portion 325-*c*) and may have a relatively small storage size (e.g., compared to the data 330). Furthermore, the L2P tables may be updated regularly (e.g., in accordance with changes to logical and physical addresses of the data 330). As such, the memory system 310 may store or otherwise update the metadata 335 using relatively frequent write operations (e.g., less frequent write operations than those associated with metadata 335).

In some examples, the host system 305 may transmit a write command that includes the data 330-*a* to the memory system 310. The memory system controller 315 may receive the data 330-*a* (e.g., via the interface 345) and generate metadata 335-*a* and metadata 340-*a* based on the data 330-*a*. In some cases, the memory system controller 315 may set a bit value in the metadata 335-*a* and/or the metadata 340-*a*, where the bit value may indicate a metadata type (e.g., journaling data, L2P table) and the portion of the memory array 320 to store the metadata to. Additionally or alternatively, the memory system controller 315 may store a first indication from the metadata 335-*a* in the first portion 325-*a* using a SLC write operation. Subsequently, the memory system controller 315 may store the data 330-*a* in the second portion 325-*b* using an MLC write operation, and a second indication from the metadata 335-*a* in the first portion 325-*a*. In some examples, the memory system controller 315, may generate the first indication prior to storing data 330-*a* and the second indication after storing data 330-*a*. The memory system controller 315 may store the metadata 340-*a* to the third portion 325-*c* using a SLC write operation. In some examples, the memory system controller 315 may store the metadata 335 and the metadata 340 in accordance with the bit value. Additionally or alternatively, the memory system controller 315 may repeat this process for each command received from the host system 305.

In some cases, the memory system 310 may retain data 330, metadata 335, and metadata 340 in the memory array 320 for a given duration (e.g., quantity of time, quantity of access cycles, quantity of access operations). For example, the memory system 310 may retain metadata 335-*a* in the first portion 325-*a* for a first duration, may retain data 330 in the second portion 325-*b* for a second duration (e.g., greater than the first duration), and may retain metadata 340-*a* in the third portion 325-*c* for a third duration (e.g., greater than the first and second durations).

In some examples, the memory system 310 may inadvertently lose power (e.g., the memory system 310 may power cycle) at a time prior to, during, or following a write operation of the data 330-*b*. The memory system 310 may regain power and thus may transition from a first power state (e.g., an OFF state) to a second power state (e.g., an ON state). Following the transition, the memory system controller 315 may determine if a write operation corresponding to data 330-*b* was initiated or set to be initiated by the memory system 310. For example, the memory system controller 315 may determine if the first indication of the metadata 335-*b* is stored in the first portion 325-*a*. If the first indication is stored in the first portion 325-*a*, the memory system controller 315 may determine that the write operation exists and may then determine if the data 330-*b* was successfully or otherwise unsuccessfully written to the second portion 325-*b*.

For instance, the memory system controller 315 may determine whether a second indication of the metadata 335-*b* (e.g., third metadata) is stored in the first portion 325-*a*. If the second indication of the metadata 335-*b* is stored in the first portion 325-*a*, the memory system controller 315 may determine that the second write operation was completed successfully and may refrain from writing (e.g., rewriting) the data 330-*b* to the second portion 325-*b*. If the second indication of the of metadata 335-*b* is not stored in the first portion 325-*a*, the memory system controller 315 may determine that the write operation was not completed or unsuccessfully completed, and may rewrite the data 330-*b* to the second portion 325-*b*. Accordingly, metadata 335 may aid in recovery operations by the memory system 310.

In some examples, the host system 305 may transmit a write command that includes the data 330-*n*, the metadata 335-*n*, and the metadata 340-*n* to the memory system controller 315, where n is an integer greater than zero. In such example, the memory system may determine that a count of access operations performed on the first portion 325-*a* satisfies (e.g., exceeds) a threshold within a duration (e.g., quantity of access cycles, quantity of access operations). Accordingly, the memory system controller 315 may store the data 330 in the second portion 325-*b* and the metadata 335-*n* and the metadata 340-*n* in the third portion 325-*c*. Alternatively, the memory system controller 315 may store the metadata 335-*n* in a fourth portion of the memory array 320 (not shown), where the fourth portion includes one or more memory blocks of SLCs. The memory system controller 315 may store the metadata 335-*n* in the third portion 325-*c* or the fourth portion in order to prolong the useful life of the first portion 325-*a* by limiting a quantity of access operations performed on the first portion 325-*a* during the duration. Additionally or alternatively, each portion 325 of the memory array 320 may include a counter to track respective access operations during a duration, such that accesses on each portion 325 may not exceed a respective threshold.

By dedicating suitable portions of the memory array 320 to store different types of data (e.g., data 330, metadata 335, metadata 340), the useful life of the memory system 310 may be prolonged and its overall performance may be improved. For example, the first portion 325-*a* may be suited to store data having low retention characteristics (e.g., journaling data), and the second portion 325-*b* and the third portion 325-*c* may be suited to store host data and logical mappings (e.g., L2P tables), respectively.

Figure 4:
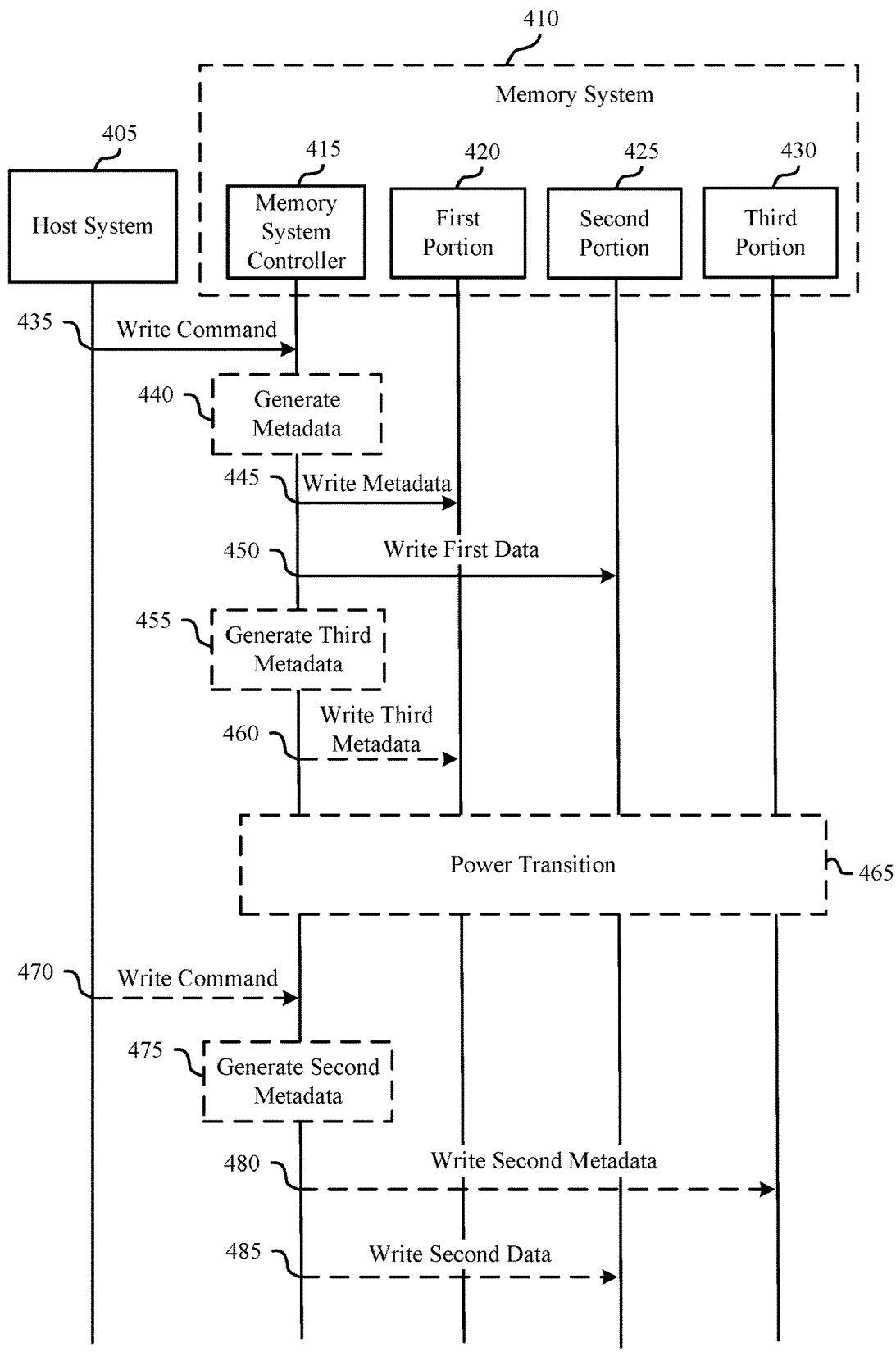
FIG. 4 illustrates an example of a process flow diagram that supports metadata allocation in memory systems in accordance with examples as disclosed herein.

FIG. 4 illustrates an example of a process flow diagram 400 that supports metadata allocation in memory systems in accordance with examples as disclosed herein. In some examples, the process flow diagram 400 may illustrate storing data (e.g., user data), first metadata (e.g., journaling data), and second metadata to one or more portions of the memory system 410 (e.g., to one or more portions 325 of a memory system 310 as described with reference to FIG. 3). The memory system 410 may be coupled with a host system 405 and may include a memory system controller 415, a first portion 420, a second portion 425, and a third portion 430. In some cases, the host system 405 may be an example of the host system 305 and the memory system 410 may be an example of the memory system 310 described with reference to FIG. 3. Additionally or alternatively, the first portion 420, the second portion 425, and the third portion 430 may be an example of the first portion 325-*a*, the second portion 325-*b*, and the third portion 325-*c* as described with reference to FIG. 3, respectively. By dedicating suitable portions of the memory system 410 to store different types of data, the useful life of the memory system 410 may be prolonged and its overall performance may be improved.

At 435, the host system 405 may transmit a write command (e.g., a first write command) to the memory system 410. In some examples, as described herein, the write command may include first data. Additionally or alternatively, the write command may include metadata (e.g., journaling data) for writing to the memory system 410.

At 440, the memory system controller 415 may generate metadata (e.g., journaling data) associated with the first data. That is, in instances where the write command does not include metadata, the memory system controller 415 may generate the metadata (e.g., the journaling data) upon receiving the write command and associated data. In some instances, generating the metadata may include setting a value of a bit of the metadata, where the bit value identifies the type of metadata. The value of the bit may indicate that the first data is to be written to the first portion 420, the second portion 425, or the third portion 430. Additionally or alternatively, the memory system controller 415 may refrain from setting a bit value or may receive a bit value in the command received from the host system 405.

At 445, the memory system controller 415 may write, using a first type of write operation, the metadata (e.g., including the first indication) to the first portion 420. The first type of write operation may be an example of an SLC write operation, where the metadata is written to one or more memory cells operated as HESLCs. In some examples, the memory system controller 415 may write the metadata to the first portion 420 based on the bit value set at 440 or based on the memory system controller 415 determining that the metadata includes journaling data.

In some examples, the memory system controller 415 may identify a quantity of access operations performed on the first portion 420 within a duration (e.g., prior to writing the metadata to the first portion 420). In such examples, if the quantity of access operations satisfies a threshold (e.g., a threshold quantity of access operations), the memory system controller 415 may write, using the first type of write operation, the metadata to the third portion 430 or a fourth portion (not shown) of the memory system 410. The memory system controller 415 may write the metadata to the third portion 430 or the fourth portion in order to mitigate wear to the first portion 425 (e.g., due to a relatively high quantity of access operations being performed on the first portion 420 within a duration).

At 450, in response to writing the metadata, the memory system controller 415 may write, using a second type of write operation, the first data to the second portion 425. The second type of write operation may be an example of an MLC write operation, where the first data is written to one or more cells operated as MLCs, TLCs, or QLCs.

At 455, the memory system controller 415 may generate third metadata. In some examples, the memory system controller may generate the third metadata (e.g., an indication of the first data being successfully written to the second portion at 450) in response to writing the first data at 450. The third metadata may include a second indication that the first data has been written to the second portion 425. At 460, the memory system controller 415 may write, using the first type of write operation, the third metadata to the first portion 420 (e.g., in accordance with the set bit). In some cases, storing the third metadata may be an example of updating the first metadata.

At 465, the memory system 410 may lose power. Following the power loss, it may be desirable for the memory system controller 415 to determine whether previous write operations (e.g., writing first data at 450) was successfully performed to mitigate errors. In such examples (e.g., when the memory system 410 regains power), the memory system controller 415 may determine whether the third metadata has been stored in the first portion 420. If the third metadata is stored to the first portion 420, the memory system controller 415 may refrain from writing (e.g., for a second time) the first data to the second portion 425 or from requesting (e.g., re-requesting) the associated data from the host system 405. If the memory system controller 415 is unable to identify the third metadata stored to the first portion 420, the memory system controller 415 may write (e.g., rewrite) the first data to the second portion 425 or may request (e.g., re-request) the first data from the host system 405.

At 470, the host system 405 may transmit a second write command to the memory system 410. In some examples, as described herein, the second write command may include second data. Additionally or alternatively, the write command may include second metadata (e.g., logical to physical mappings) for writing to the memory system 410.

At 475, in response to receiving the second write command, the memory system controller 415 may generate or otherwise update second metadata associated with the second data. That is, in instances where the write command does not include metadata, the memory system controller 415 may generate the second metadata upon receiving the write command and associated data. In some instances, the second metadata may include a mapping between logical and physical addresses of the memory system 410 (e.g., a logical-to-physical (L2P) table), and may aid in access operations (e.g., read operations, write operations) associated with the second data. In some cases, generating the second metadata may include determining the type of metadata and setting a bit value of the second metadata based on the determination. Additionally or alternatively, the memory system controller may refrain from setting a bit value.

At 480, the memory system controller 415 may write, using the first type of write operation, the second metadata to the third portion 430. In some examples, the memory system controller 415 may write the second metadata to the third portion 430 based on a bit value set at 475 or based on the memory system controller 415 determining that the second metadata includes a logical to physical mapping. At 485, the memory system controller 415 may write, using the second type of write operation, the second data to the second portion 425.

In some examples, the memory system controller 415 may generate and store both journaling data and logical to physical mappings in accordance with data from the same write command. Additionally or alternatively, the memory system controller 415 may store or otherwise update journaling data at a greater rate than logical to physical mappings. In such examples, different types of data may be stored to suitably configured portions of the memory system 410 (e.g., in accordance with one or more characteristics associated with the data). By dedicating suitable portions of the memory system 410 to store different types of data, the useful life of the memory system 410 may be prolonged and its overall performance may be improved.

Figure 5:
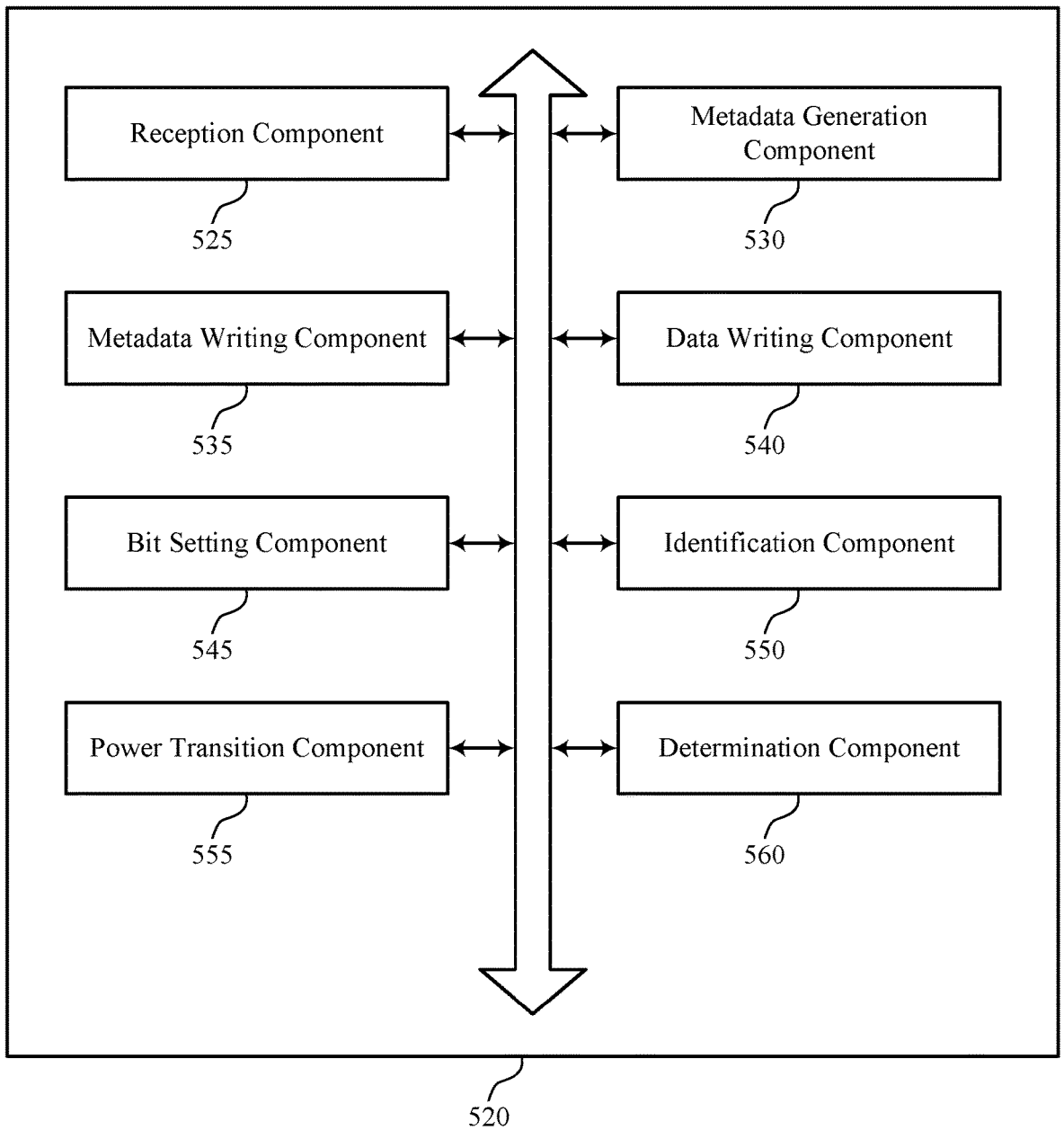
FIG. 5 shows a block diagram of a memory system that supports metadata allocation in memory systems in accordance with examples as disclosed herein.

FIG. 5 shows a block diagram 500 of a memory system 520 that supports metadata allocations in memory systems in accordance with examples as disclosed herein. The memory system 520 may be an example of aspects of a memory system as described with reference to FIGS. 1 through 4. The memory system 520, or various components thereof, may be an example of means for performing various aspects of metadata allocations in memory systems as described herein. For example, the memory system 520 may include a reception component 525, a metadata generation component 530, a metadata writing component 535, a data writing component 540, a bit setting component 545, an identification component 550, a power transition component 555, a determination component 560, or any combination thereof. Each of these components may communicate, directly or indirectly, with one another (e.g., via one or more buses).

The reception component 525 may be configured as or otherwise support a means for receiving, at a memory device, a write command including first data, the memory device including a first portion associated with a first data retention characteristic and a second portion associated with a second data retention characteristic. The metadata generation component 530 may be configured as or otherwise support a means for generating metadata associated with the first data based at least in part on receiving the write command. The metadata writing component 535 may be configured as or otherwise support a means for writing, using a first type of write operation, the metadata to the first portion of the memory device based at least in part on the metadata being associated with a first type of data. The data writing component 540 may be configured as or otherwise support a means for writing, using a second type of write operation, the first data to the second portion of the memory device based at least in part on writing the metadata to the first portion of the memory device.

In some examples, the metadata generation component 530 may be configured as or otherwise support a means for generating second metadata associated with second data based at least in part on receiving a second write command. In some examples, the metadata writing component 535 may be configured as or otherwise support a means for writing, using the first type of write operation, the second metadata to a third portion of the memory device associated with a third data retention characteristic based at least in part on the second metadata being associated with a second type of data.

In some examples, the reception component 525 may be configured as or otherwise support a means for receiving, at the memory device, a second write command including second data, where generating the second metadata is based at least in part on receiving the second write command. In some examples, the data writing component 540 may be configured as or otherwise support a means for writing, using the second type of write operation, the second data to the second portion of the memory device based at least in part on writing the second metadata to the third portion of the memory device associated with the third data retention characteristic.

In some examples, to support generating the metadata associated with the first data, the bit setting component 545 may be configured as or otherwise support a means for setting a value of at least one bit of the metadata to a first value, where writing the metadata to the first portion of the memory device is based at least in part on the first value of the at least one bit of the metadata.

In some examples, to support writing the metadata to the first portion of the memory device, the metadata writing component 535 may be configured as or otherwise support a means for writing, using the first type of write operation, an indication that the first data is to be written to the second portion of the memory device using the second type of write operation.

In some examples, the metadata generation component 530 may be configured as or otherwise support a means for generating third metadata associated with the first data based at least in part on writing the first data to the second portion of the memory device. In some examples, the metadata writing component 535 may be configured as or otherwise support a means for writing, using the first type of write operation, the third metadata to the first portion of the memory device based at least in part on generating the third metadata.

In some examples, to support writing the third metadata to the first portion of the memory device, the metadata writing component 535 may be configured as or otherwise support a means for writing, using the first type of write operation, a second indication that the first data has been written to the second portion of the memory device using the second type of write operation.

In some examples, the power transition component 555 may be configured as or otherwise support a means for transitioning, by the memory device, from a first power state to a second power state after writing the third metadata to the first portion of the memory device. In some examples, the determination component 560 may be configured as or otherwise support a means for determining whether the second indication is stored in the first portion of the memory device based at least in part on transitioning from the first power state to the second power state. In some examples, the data writing component 540 may be configured as or otherwise support a means for refraining from writing, for a second time, the first data to the second portion of the memory device based at least in part on determining that the second indication is stored in the first portion of the memory device.

In some examples, the metadata generation component 530 may be configured as or otherwise support a means for generating fourth metadata associated with third data based at least in part on receiving a third write command. In some examples, the identification component 550 may be configured as or otherwise support a means for identifying a quantity of access operations performed on the first portion of the memory device within a duration. In some examples, the metadata writing component 535 may be configured as or otherwise support a means for writing, using the first type of write operation, the fourth metadata to a third portion of the memory device associated with a third data retention characteristic or a fourth portion of the memory device based at least in part on the quantity of access cycles satisfying a threshold.

In some examples, the metadata writing component 535 may be configured as or otherwise support a means for writing, using the first type of write operation, the fourth metadata to the fourth portion of the memory device based at least in part on the fourth metadata including journaling data.

In some examples, the first portion of the memory device and a third portion of the memory device associated with a third data retention characteristic each include one or more memory cells operated as single-level cells (SLCs). In some examples, the second portion of the memory device includes one or more memory cells operated as multi-level cells (MLCs), triple-level cell (TLC), or quad-level cell (QLC).

In some examples, metadata stored to the first portion of the memory device is updated at a faster rate than metadata stored to a third portion of the memory device associated with a third data retention characteristic.

In some examples, the first type of write operation writes information to one or more memory cells operated as single-level cells (SLCs). In some examples, the second type of write operation writes information to one or more memory cells operated as multi-level cells (MLCs), triple-level cell (TLC), or quad-level cell (QLC).

Figure 6:
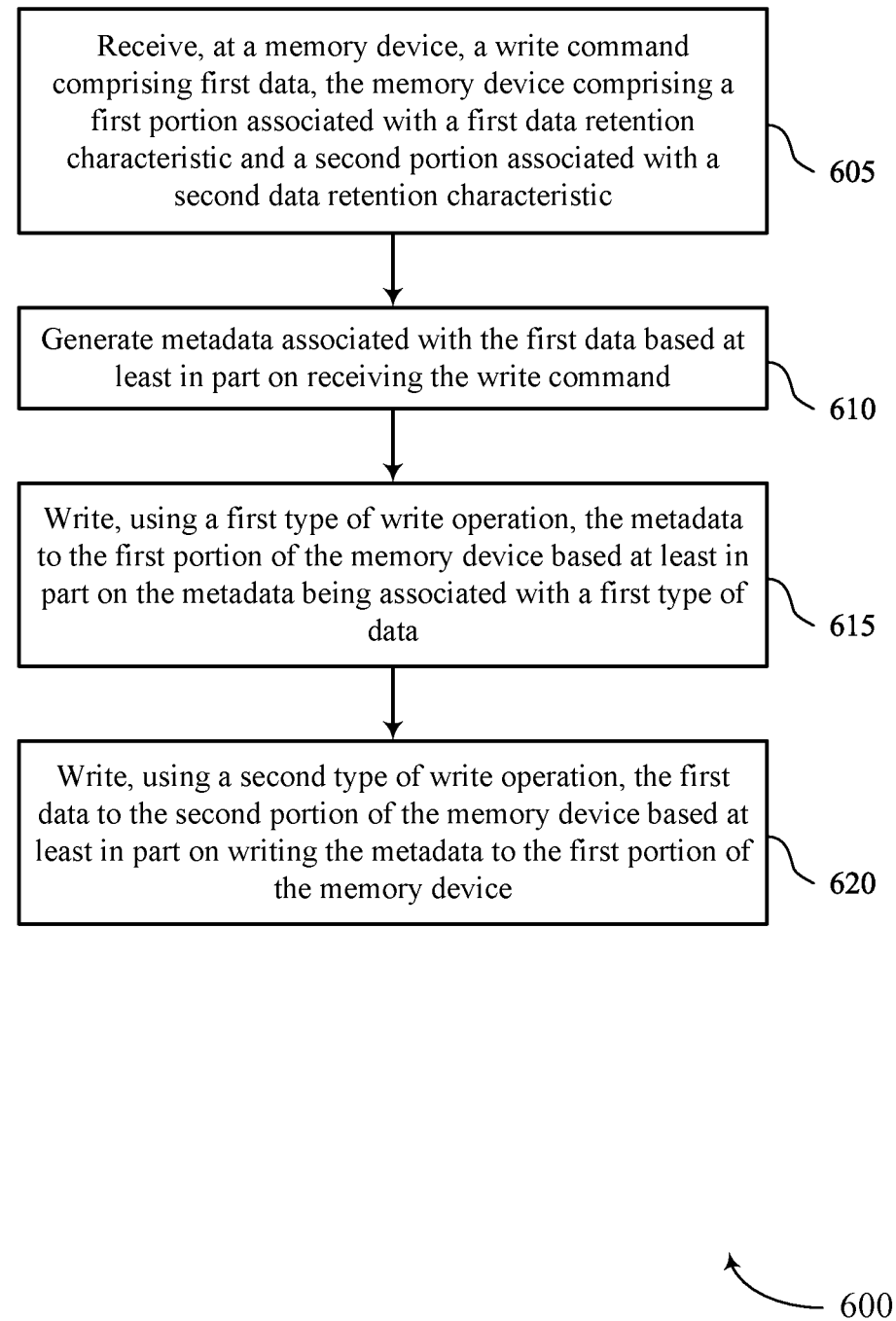
FIG. 6 shows a flowchart illustrating a method or methods that support metadata allocation in memory systems in accordance with examples as disclosed herein.

FIG. 6 shows a flowchart illustrating a method 600 that supports metadata allocations in memory systems in accordance with examples as disclosed herein. The operations of method 600 may be implemented by a memory system or its components as described herein. For example, the operations of method 600 may be performed by a memory system as described with reference to FIGS. 1 through 5. In some examples, a memory system may execute a set of instructions to control the functional elements of the device to perform the described functions. Additionally, or alternatively, the memory system may perform aspects of the described functions using special-purpose hardware.

At 605, the method may include receiving, at a memory device, a write command including first data, the memory device including a first portion associated with a first data retention characteristic and a second portion associated with a second data retention characteristic. The operations of 605 may be performed in accordance with examples as disclosed herein. In some examples, aspects of the operations of 605 may be performed by a reception component 525 as described with reference to FIG. 5.

At 610, the method may include generating metadata associated with the first data based at least in part on receiving the write command. The operations of 610 may be performed in accordance with examples as disclosed herein. In some examples, aspects of the operations of 610 may be performed by a metadata generation component 530 as described with reference to FIG. 5.

At 615, the method may include writing, using a first type of write operation, the metadata to the first portion of the memory device based at least in part on the metadata being associated with a first type of data. The operations of 615 may be performed in accordance with examples as disclosed herein. In some examples, aspects of the operations of 615 may be performed by a metadata writing component 535 as described with reference to FIG. 5.

At 620, the method may include writing, using a second type of write operation, the first data to the second portion of the memory device based at least in part on writing the metadata to the first portion of the memory device. The operations of 620 may be performed in accordance with examples as disclosed herein. In some examples, aspects of the operations of 620 may be performed by a data writing component 540 as described with reference to FIG. 5.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving, at a memory device, a write command including first data, the memory device including a first portion associated with a first data retention characteristic and a second portion associated with a second data retention characteristic; generating metadata associated with the first data based at least in part on receiving the write command; writing, using a first type of write operation, the metadata to the first portion of the memory device based at least in part on the metadata being associated with a first type of data; and writing, using a second type of write operation, the first data to the second portion of the memory device based at least in part on writing the metadata to the first portion of the memory device.

Aspect 2: The method, apparatus, or non-transitory computer-readable medium of aspect 1, further including operations, features, circuitry, logic, means, or instructions, or any combination thereof for generating second metadata associated with second data based at least in part on receiving a second write command and writing, using the first type of write operation, the second metadata to a third portion of the memory device associated with a third data retention characteristic based at least in part on the second metadata being associated with a second type of data.

Aspect 3: The method, apparatus, or non-transitory computer-readable medium of aspect 2, further including operations, features, circuitry, logic, means, or instructions, or any combination thereof for receiving, at the memory device, a second write command including second data, where generating the second metadata is based at least in part on receiving the second write command and writing, using the second type of write operation, the second data to the second portion of the memory device based at least in part on writing the second metadata to the third portion of the memory device associated with the third data retention characteristic.

Aspect 4: The method, apparatus, or non-transitory computer-readable medium of any of aspects 1 through 3, where generating the metadata associated with the first data includes operations, features, circuitry, logic, means, or instructions, or any combination thereof for setting a value of at least one bit of the metadata to a first value, where writing the metadata to the first portion of the memory device is based at least in part on the first value of the at least one bit of the metadata.

Aspect 5: The method, apparatus, or non-transitory computer-readable medium of any of aspects 1 through 4, where writing the metadata to the first portion of the memory device includes operations, features, circuitry, logic, means, or instructions, or any combination thereof for writing, using the first type of write operation, an indication that the first data is to be written to the second portion of the memory device using the second type of write operation.

Aspect 6: The method, apparatus, or non-transitory computer-readable medium of any of aspects 1 through 5, further including operations, features, circuitry, logic, means, or instructions, or any combination thereof for generating third metadata associated with the first data based at least in part on writing the first data to the second portion of the memory device and writing, using the first type of write operation, the third metadata to the first portion of the memory device based at least in part on generating the third metadata.

Aspect 7: The method, apparatus, or non-transitory computer-readable medium of aspect 6, where writing the third metadata to the first portion of the memory device includes operations, features, circuitry, logic, means, or instructions, or any combination thereof for writing, using the first type of write operation, a second indication that the first data has been written to the second portion of the memory device using the second type of write operation.

Aspect 8: The method, apparatus, or non-transitory computer-readable medium of aspect 7, further including operations, features, circuitry, logic, means, or instructions, or any combination thereof for transitioning, by the memory device, from a first power state to a second power state after writing the third metadata to the first portion of the memory device; determining whether the second indication is stored in the first portion of the memory device based at least in part on transitioning from the first power state to the second power state; and refraining from writing, for a second time, the first data to the second portion of the memory device based at least in part on determining that the second indication is stored in the first portion of the memory device.

Aspect 9: The method, apparatus, or non-transitory computer-readable medium of any of aspects 1 through 8, further including operations, features, circuitry, logic, means, or instructions, or any combination thereof for generating fourth metadata associated with third data based at least in part on receiving a third write command; identifying a quantity of access operations performed on the first portion of the memory device within a duration; and writing, using the first type of write operation, the fourth metadata to a third portion of the memory device associated with a third data retention characteristic or a fourth portion of the memory device based at least in part on the quantity of access cycles satisfying a threshold.

Aspect 10: The method, apparatus, or non-transitory computer-readable medium of aspect 9, further including operations, features, circuitry, logic, means, or instructions, or any combination thereof for writing, using the first type of write operation, the fourth metadata to the fourth portion of the memory device based at least in part on the fourth metadata including journaling data.

Aspect 11: The method, apparatus, or non-transitory computer-readable medium of any of aspects 1 through 10, where the first portion of the memory device and a third portion of the memory device associated with a third data retention characteristic each include one or more memory cells operated as single-level cells (SLCs) and the second portion of the memory device includes one or more memory cells operated as multi-level cells (MLCs), triple-level cell (TLC), or quad-level cell (QLC).

Aspect 12: The method, apparatus, or non-transitory computer-readable medium of any of aspects 1 through 11, where metadata stored to the first portion of the memory device is updated at a faster rate than metadata stored to a third portion of the memory device associated with a third data retention characteristic.

Aspect 13: The method, apparatus, or non-transitory computer-readable medium of any of aspects 1 through 12, where the first type of write operation writes information to one or more memory cells operated as single-level cells (SLCs) and the second type of write operation writes information to one or more memory cells operated as multi-level cells (MLCs), triple-level cell (TLC), or quad-level cell (QLC).

It should be noted that the described methods include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The term "layer" or "level" used herein refers to a stratum or sheet of a geometrical structure (e.g., relative to a substrate). Each layer or level may have three dimensions (e.g., height, width, and depth) and may cover at least a portion of a surface. For example, a layer or level may be a three dimensional structure where two dimensions are greater than a third, e.g., a thin-film. Layers or levels may include different elements, components, or materials, or combinations thereof. In some examples, one layer or level may be composed of two or more sublayers or sublevels.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
receiving, at a memory device, a write command comprising first data, the memory device comprising a first portion associated with a first data retention characteristic and a second portion associated with a second data retention characteristic;
generating metadata associated with the first data based at least in part on receiving the write command;
writing, using a first type of write operation, the metadata to the first portion of the memory device based at least in part on the metadata being associated with a first type of data;
writing, using a second type of write operation, the first data to the second portion of the memory device based at least in part on writing the metadata to the first portion of the memory device;
transitioning, by the memory device, from a first power state to a second power state; and
refraining from writing, for a second time, the first data to the second portion of the memory device based at least in part on determining that a second indication is stored in the first portion of the memory device, wherein determining that the second indication is stored in the first portion of the memory device is based at least in part on transitioning from the first power state to the second power state.

2. The method of claim 1, further comprising:
generating second metadata associated with second data based at least in part on receiving a second write command; and
writing, using the first type of write operation, the second metadata to a third portion of the memory device associated with a third data retention characteristic based at least in part on the second metadata being associated with a second type of data.

3. The method of claim 2, further comprising:
receiving, at the memory device, the second write command comprising second data, wherein generating the second metadata is based at least in part on receiving the second write command; and
writing, using the second type of write operation, the second data to the second portion of the memory device based at least in part on writing the second metadata to the third portion of the memory device associated with the third data retention characteristic.

4. The method of claim 1, wherein generating the metadata associated with the first data comprises:
setting a value of at least one bit of the metadata to a first value, wherein writing the metadata to the first portion of the memory device is based at least in part on the first value of the at least one bit of the metadata.

5. The method of claim 1, wherein the metadata associated with the first data comprises journaling data, wherein writing the metadata to the first portion of the memory device comprises:
writing, using the first type of write operation, an indication that the first data is to be written to the second portion of the memory device using the second type of write operation.

6. The method of claim 1, further comprising:
generating third metadata associated with the first data based at least in part on writing the first data to the second portion of the memory device; and
writing, using the first type of write operation, the third metadata to the first portion of the memory device based at least in part on generating the third metadata.

7. The method of claim 6, wherein the third metadata associated with the first data comprises journaling data, wherein writing the third metadata to the first portion of the memory device comprises:
  writing, using the first type of write operation, the second indication that the first data has been written to the second portion of the memory device using the second type of write operation.

8. The method of claim 1, further comprising:
  generating fourth metadata associated with third data based at least in part on receiving a third write command;
  identifying a quantity of access operations performed on the first portion of the memory device within a duration; and
  writing, using the first type of write operation, the fourth metadata to a third portion of the memory device associated with a third data retention characteristic or a fourth portion of the memory device based at least in part on the quantity of access operations satisfying a threshold.

9. The method of claim 8, further comprising:
  writing, using the first type of write operation, the fourth metadata to the fourth portion of the memory device based at least in part on the fourth metadata comprising journaling data.

10. The method of claim 1, wherein:
  the first portion of the memory device and a third portion of the memory device associated with a third data retention characteristic each comprise one or more memory cells operated as single-level cells (SLCs); and
  the second portion of the memory device comprises one or more memory cells operated as multi-level cells (MLCs), triple-level cell (TLC), or quad-level cell (QLC).

11. The method of claim 1, wherein metadata stored to the first portion of the memory device is updated at a faster rate than metadata stored to a third portion of the memory device associated with a third data retention characteristic.

12. The method of claim 1, wherein:
  the first type of write operation writes information to one or more memory cells operated as single-level cells (SLCs); and
  the second type of write operation writes information to one or more memory cells operated as multi-level cells (MLCs), triple-level cell (TLC), or quad-level cell (QLC).

13. A memory system, comprising:
  one or more memory devices; and
  processing circuitry coupled with the one or more memory devices, wherein the processing circuitry is configured to cause the memory system to:
    receive, at a memory device of the one or more memory devices, a write command comprising first data, the memory device comprising a first portion associated with a first data retention characteristic and a second portion associated with a second data retention characteristic;
    generate metadata associated with the first data based at least in part on receiving the write command;
    write, using a first type of write operation, the metadata to the first portion of the memory device based at least in part on the metadata being associated with a first type of data;
    write, using a second type of write operation, the first data to the second portion of the memory device based at least in part on writing the metadata to the first portion of the memory device;
    transition, by the memory device, from a first power state to a second power state; and
    refrain from writing, for a second time, the first data to the second portion of the memory device based at least in part on determining that a second indication is stored in the first portion of the memory device, wherein determining that the second indication is stored in the first portion of the memory device is based at least in part on transitioning from the first power state to the second power state.

14. The memory system of claim 13, wherein the processing circuitry is further configured to cause the memory system to:
  generate second metadata associated with second data based at least in part on receiving a second write command; and
  write, using the first type of write operation, the second metadata to a third portion of the memory device associated with a third data retention characteristic based at least in part on the second metadata being associated with a second type of data.

15. The memory system of claim 14, wherein the processing circuitry is further configured to cause the memory system to:
  receive, at the memory device, the second write command comprising second data, wherein generating the second metadata is based at least in part on receiving the second write command; and
  write, using the second type of write operation, the second data to the second portion of the memory device based at least in part on writing the second metadata to the third portion of the memory device associated with the third data retention characteristic.

16. The memory system of claim 13, wherein generating the metadata associated with the first data is configured to cause the memory system to:
  set a value of at least one bit of the metadata to a first value, wherein writing the metadata to the first portion of the memory device is based at least in part on the first value of the at least one bit of the metadata.

17. The memory system of claim 13, wherein writing the metadata to the first portion of the memory device is configured to cause the memory system to:
  write, using the first type of write operation, an indication that the first data is to be written to the second portion of the memory device using the second type of write operation.

18. The memory system of claim 13, wherein the processing circuitry is further configured to cause the memory system to:
  generate third metadata associated with the first data based at least in part on writing the first data to the second portion of the memory device; and
  write, using the first type of write operation, the third metadata to the first portion of the memory device based at least in part on generating the third metadata.

19. The memory system of claim 18, wherein writing the third metadata to the first portion of the memory device is configured to cause the memory system to:
  write, using the first type of write operation, the second indication that the first data has been written to the second portion of the memory device using the second type of write operation.

20. The memory system of claim 13, wherein the processing circuitry is further configured to cause the memory system to:
- generate fourth metadata associated with third data based at least in part on receiving a third write command;
- identify a quantity of access operations performed on the first portion of the memory device within a duration; and
- write, using the first type of write operation, the fourth metadata to a third portion of the memory device associated with a third data retention characteristic or a fourth portion of the memory device based at least in part on the quantity of access operations satisfying a threshold.

21. A non-transitory computer-readable medium storing code, the code comprising instructions executable by one or more processors to:
- receive, at a memory device, a write command comprising first data, the memory device comprising a first portion associated with a first data retention characteristic and a second portion associated with a second data retention characteristic;
- generate metadata associated with the first data based at least in part on receiving the write command;
- write, using a first type of write operation, the metadata to the first portion of the memory device based at least in part on the metadata being associated with a first type of data;
- write, using a second type of write operation, the first data to the second portion of the memory device based at least in part on writing the metadata to the first portion of the memory device;
- transition, by the memory device, from a first power state to a second power state: and
- refrain from writing, for a second time, the first data to the second portion of the memory device based at least in part on determining that a second indication is stored in the first portion of the memory device, wherein determining that a second indication is stored in the first portion of the memory device is based at least in part on transitioning from the first power state to the second power state.

22. The non-transitory computer-readable medium of claim 21, wherein the instructions are further executable by the one or more processors to:
- generate second metadata associated with second data based at least in part on receiving a second write command; and
- write, using the first type of write operation, the second metadata to a third portion of the memory device associated with a third data retention characteristic based at least in part on the second metadata being associated with a second type of data.

23. The non-transitory computer-readable medium of claim 22, wherein the instructions are further executable by the one or more processors to:
- receive, at the memory device, the second write command comprising second data, wherein generating the second metadata is based at least in part on receiving the second write command; and
- write, using the second type of write operation, the second data to the second portion of the memory device based at least in part on writing the second metadata to the third portion of the memory device associated with the third data retention characteristic.

\* \* \* \* \*